R. AND J. N. KISSINGER.
DIRIGIBLE HEADLIGHT.
APPLICATION FILED APR. 12, 1919.

1,312,736.

Patented Aug. 12, 1919
2 SHEETS—SHEET 1.

Witnesses
G. E. Walling
U. B. Hillyard.

Inventor
Roger Kissinger &
Jerome N. Kissinger
By Richard Beaver,
Attorney

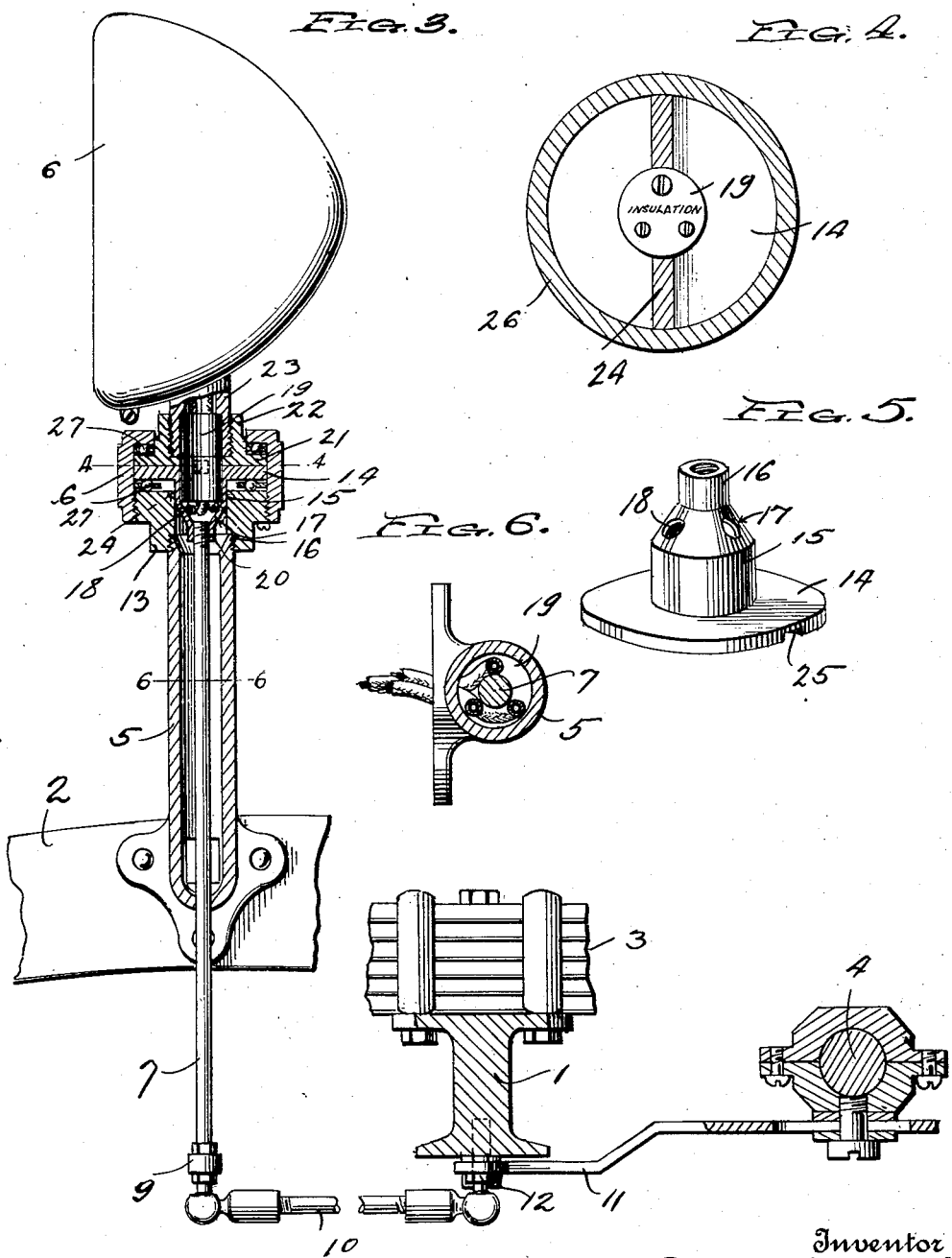

UNITED STATES PATENT OFFICE.

ROGER KISSINGER AND JEROME N. KISSINGER, OF LYKENS, PENNSYLVANIA.

DIRIGIBLE HEADLIGHT.

1,312,736.   Specification of Letters Patent.   Patented Aug. 12, 1919.

Application filed April 12, 1919. Serial No. 289,559.

*To all whom it may concern:*

Be it known that we, ROGER KISSINGER and JEROME N. KISSINGER, citizens of the United States, residing at Lykens, in the county of Dauphin and State of Pennsylvania, have invented certain new and useful Improvements in Dirigible Headlights, of which the following is a specification.

The invention relates to headlights for motor vehicles and more particularly to the mountings and connections, whereby the headlights of an automobile or motor vehicle are adapted to move in unison with the steering wheels so as to throw the light on the roadway in advance of the machine when turning as well as when going straight ahead.

The invention relates more particularly to electric headlights of the type embodying high and low lamps in different circuits so that the lead wires are concealed and adapt themselves to the turning of the headlights without producing any binding or straining action.

The invention furthermore aims to provide connecting means, whereby the headlight may be readily disconnected from or connected to the supporting post or upright so that provision is had for making repairs or replacements quickly and at a relatively small cost and without inconvenience or the requirement of special tools.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the drawings hereto attached,

Fig. 3 is an enlarged sectional view showing the relationship of the parts.

Fig. 4 is a sectional detail on the line 4—4 of Fig. 3.

Fig. 5 is a detail perspective view of a connecting member.

Fig. 6 is a detail section on the line 6—6 of Fig. 3.

Corresponding and like parts are referred to in the following description and indicated in the several views of the drawings by like reference characters.

Figure 1:
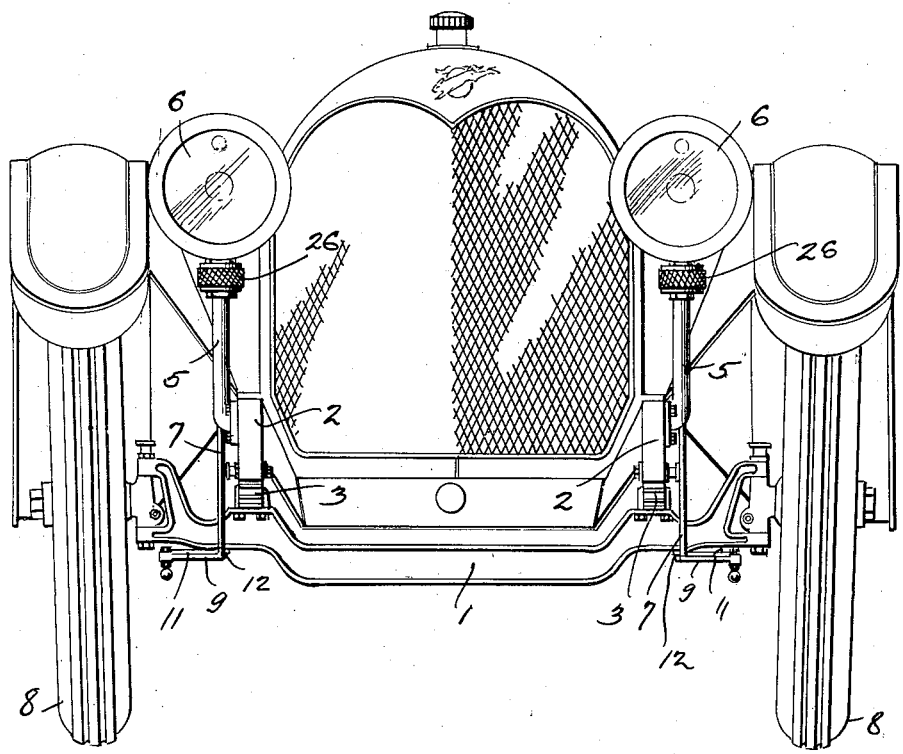
Figure 1 is a front view of an automobile provided with headlights embodying the invention.
Figure 2:
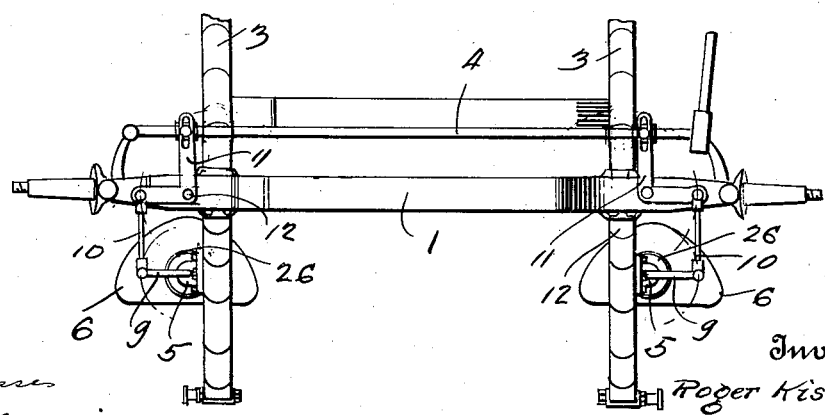
Fig. 2 is a detail view of a portion of the running gear showing the invention more in detail.

Inasmuch as the headlights are designed chiefly for automobiles they are shown applied in this manner in Fig. 1 which illustrate a conventional form of automobile embodying an axle 1, side beams 2 and springs 3. The steering knuckles are connected by means of a drag link 4. These parts may be of any well known construction and arrangement depending upon the type of motor vehicle to which the invention is to be adapted.

Bracket posts or uprights 5 are secured at their lower ends to the side beams 2 in any manner and are provided at their upper ends with headlights 6 of any type. A shaft 7 extends through each of the posts or uprights 5 and is connected at its upper end with the headlights 6 and at its lower end with drag link 4 by suitable means, whereby the steering wheels 8 and headlights move in unison, thereby keeping the light on the road whether the machine is going straight ahead, rounding a curve or making a turn. Each of the shafts 7 is provided at its lower end with an arm 9 which is connected by means of a link 10 with the lateral arm of a bell crank 11 which is pivotally connected at 12 to the axle 1. The longitudinal arm of the bell crank 11 is slotted and is connected to the drag link 4. The arrangement is such that both headlights turn in unison with the steering wheels and in the same direction, thereby throwing the light in the direction of travel whether the path is straight, rounding or turns.

A fitting 13 is secured to the upper ends of each of the posts or uprights 5. The fitting 13 supports a connecting member substantially as shown most clearly in Fig. 5, the same embodying a flange 14 and a tube which consists of a relatively large portion 15, a small portion 16 and a tapering portion 17 in which is formed a series of openings 18 for the passage of the lead wires running to the lamp of the headlight. This connecting member is arranged with the tubular portion extending into the fitting 13 and with the flange 14 overlaping the fitting. The enlarged portion 15 fits snugly within the fitting 13. The small portion 16 receives the upper end of the shaft 7 which is threaded or otherwise connected thereto to cause the connecting member and shaft to turn together. There is ample space between the shaft 7 and the inner walls of the post or upright 5 for the passage of the wires, as indicated most clearly in Fig. 6. These wires pass through the openings 18 and carry the current to the lamps of the headlight. A plug connection 19 of ordinary construction is interposed in the length of the wire and is located within the connecting member. The upper end of the post or upright 5 is beveled, as indicated at 20 to obviate the formation of a sharp corner which would be liable to cut the insulation of the wires.

A companion connecting member is supported upon and keyed to the flange 14 of the lower connecting member. This upper connecting member comprises a flange 21 and a socket 22, the latter receiving a short tube or nipple 23 depending from the lower portion of the headlight. A key 24 is fitted in key ways 25 formed in the flanges 14 and 21 of the upper and lower connecting members to cause both to move together. A union 26 couples the upper and lower connecting members to one another and to the fitting 13, as shown most clearly in Fig. 3. The union 26 is threaded to the fitting 13 and its upper flanged end engages over the flange 21 of the upper connecting member. Ball bearings 27 are interposed between the flange 14 and fitting 13 and flange 21 and the overhanging flange of the union 26. In this manner the parts operate with a minimum amount of friction. The plug connection 19 embodies two parts, one part being mounted in the upper and lower connecting members and the other part being disposed within the tube or nipple 23. When the union 26 is disconnected from the fitting 13 the headlight may be removed, the parts of the plug connection 19 separating in a manner well understood.

When the invention is installed upon an automobile or analogous motor vehicle the parts are assembled substantially as set forth herein and illustrated in the accompanying drawings. When the steering wheels 8 are disposed straight ahead the headlights illuminate the roadway in the direct course of the machine. When the steering wheels are turned to the right or to the left the headlights are correspondingly moved with the result that the roadway in the path of the machine is illuminated, thereby enabling the driver to steer clear of any danger and also obviating any material reduction of speed when making a curve after dark because the roadway is sufficiently lighted for safe driving.

The foregoing description and the drawings have reference to what may be considered the preferred, or approved form of our invention. It is to be understood that we may make such changes in construction and arrangement and combination of parts, materials, dimensions, et cetera, as may prove expedient and fall within the scope of the appended claims.

Having thus fully described our invention, what we claim as new and desire to secure by Letters Patent is:—

1. In a dirigible headlight, an upright, a fitting at the upper end of the upright, a shaft extending through the upright, a lower connecting member mounted on the fitting and connected to the shaft to turn therewith, an upper connecting member keyed to the lower connecting member, a headlight coupled to the upper connecting member and a union coupling the upper and lower connecting members to one another and to the said fitting.

2. In a dirigible headlight, an upright, a fitting at the upper end of the upright, a shaft extending through the upright, a lower connecting member mounted on the fitting and connected to the shaft to turn therewith, an upper connecting member keyed to the lower connecting member, a headlight coupled to the upper connecting member, a union coupling the upper and lower connecting members to one another and to the said fitting, and a plug connection mounted in said upper and lower connecting members, the upper member of the plug connection being movable with the headlight.

3. In a dirigible headlight, an upright, a fitting at the upper end of the upright, a shaft extending through the upright, a lower connecting member comprising a flange and tube, the flange overhanging said fitting and the tube being mounted therein and comprising relatively large and small portions and an intermediate tapering portion in which openings are formed for the passage of lead wires to the lamps of the headlight, an upper connecting member, a union coupling the upper and lower connecting members to one another and to the fitting and a headlight coupled to the upper connecting member, the lower connecting member being attached to the upper end of the said shaft.

4. In a dirigible headlight, an upright, a fitting at the upper end of the upright, a shaft extending through the upright, a lower connecting member including a flange overhanging the fitting and a tube journaled with the fitting and comprising relatively large and small portions and an intermediate tapering portion in which openings are formed for the passage of electric wires for the headlight, an upper connecting member embodying a flange and a socket, a union coupling the upper and lower connecting members to one another and to said fitting, ball bearings between the connecting members and the confining parts of the fitting and union, a headlight coupled to the upper connecting member and a plug connection disposed within said upper and lower connecting members.

5. In a dirigible headlight, a bracket post having its upper end beveled upon its inner side, a fitting on the post, a lower connecting member comprising a flange and tube, the flange overhanging the fitting and the tube being journaled therein and comprising large and small portions and an intermediate tapering portion in which openings are formed for the passage of electric wires for the headlight, an upper connecting member keyed to the lower connecting member and comprising a flange and a socket, a union coupling the upper and lower connecting members to one another and to the said fitting, ball bearings between the connecting members and their confining parts, a headlight coupled to the upper connecting member, a shaft passing through the bracket post and connected to the lower end of the lower connecting member and a plug connection disposed within said upper and lower connecting members.

In testimony whereof we affix our signatures in presence of two witnesses.

ROGER KISSINGER.
JEROME N. KISSINGER.

Witnesses:
W. H. UHLER,
W. S. YOUNG.